(12) United States Patent
Lu

(10) Patent No.: US 10,639,831 B2
(45) Date of Patent: May 5, 2020

(54) ANTI-FATIGUE MATS AND METHODS FOR MAKING THE SAME

(71) Applicant: XIAMEN SHEEP ANTI-FATIGUE MAT CO., LTD, Xiamen (CN)

(72) Inventor: Xiangyang Lu, Xiamen (CN)

(73) Assignee: XIAMEN SHEEP ANTI-FATIGUE MAT CO., LTD, Xiamen (CN)

( * ) Notice: Subject to any disclaimer, the term of this patent is extended or adjusted under 35 U.S.C. 154(b) by 318 days.

(21) Appl. No.: 15/727,634

(22) Filed: Oct. 9, 2017

(65) Prior Publication Data
US 2019/0021534 A1 Jan. 24, 2019

(30) Foreign Application Priority Data

Jul. 21, 2017 (CN) .......................... 2017 1 0600520

(51) Int. Cl.
*B29C 45/14* (2006.01)
*A47G 27/02* (2006.01)
(Continued)

(52) U.S. Cl.
CPC ...... *B29C 45/1418* (2013.01); *A47G 27/0231* (2013.01); *B29B 15/10* (2013.01); *B29C 33/42* (2013.01); *B29C 35/02* (2013.01); *B29C 44/1252* (2013.01); *B29C 44/1271* (2013.01); *B29C 44/14* (2013.01); *B29C 44/5627* (2013.01); *B29C 45/0001* (2013.01); *B29C 45/14008* (2013.01); *B29C 45/263* (2013.01); *B29C 45/372* (2013.01); *B29C 71/00* (2013.01); *B29D 99/0057* (2013.01);
(Continued)

(58) Field of Classification Search
CPC . B29C 44/1252; B29C 44/5627; B29C 44/12; B29C 44/1219; B29C 44/1271; B29C 44/14; B29C 44/145; B29C 45/1418; B29C 45/263; B29C 45/2632; B29C 45/372; B29C 45/374; B29C 2045/14729; B29C 2045/14704
See application file for complete search history.

(56) References Cited

U.S. PATENT DOCUMENTS 10,173,355 B2 * 1/2019 Leonhardt ........... B29C 45/1418
2006/0121251 A1 * 6/2006 Oberacher ........... B29C 45/1418
428/172

FOREIGN PATENT DOCUMENTS

CN 103252970 A * 8/2013
CN 103507205 A * 1/2014
(Continued)

*Primary Examiner* — Atul P. Khare

(57) ABSTRACT

The present disclosure discloses an anti-fatigue mat and methods for making the same. The method for making an anti-fatigue mat includes providing a leather comprising a first surface and a second surface opposite to the first surface, forming a color layer on the first surface, cutting the leather, putting the cut leather into a mold, injecting an elastomeric material into the mold, curing the elastomeric material to form an elastic layer on the second surface and a plurality of concave structures corresponding to the plurality of protruding structures on the first surface, and polishing the first surface to remove the color layer without caving towards the second surface. The anti-fatigue mat can have anti-fatigue performance and vivid stereoscopic impression, where being simple to fabricate with low costs and can be industrialized.

9 Claims, 2 Drawing Sheets

(51) Int. Cl.
*B29C 45/00* (2006.01)
*B29C 35/02* (2006.01)
*B29C 33/42* (2006.01)
*B29B 15/10* (2006.01)
*B29C 71/00* (2006.01)
*B29C 44/14* (2006.01)
*B29D 99/00* (2010.01)
*B29C 44/12* (2006.01)
*B29C 45/37* (2006.01)
*B29C 44/56* (2006.01)
*B29C 45/26* (2006.01)
*B29K 75/00* (2006.01)
*B29K 27/06* (2006.01)
*B29K 711/08* (2006.01)

(52) U.S. Cl.
CPC .............. *B29C 2045/14729* (2013.01); *B29C 2793/0009* (2013.01); *B29C 2945/7604* (2013.01); *B29C 2945/76076* (2013.01); *B29K 2027/06* (2013.01); *B29K 2075/00* (2013.01); *B29K 2711/08* (2013.01); *B29K 2827/06* (2013.01)

(56) References Cited

FOREIGN PATENT DOCUMENTS

| | | | | |
|---|---|---|---|---|
| CN | 104760457 A | | 7/2015 | |
| CN | 105064022 A | * | 11/2015 | |
| CN | 105200171 A | | 12/2015 | |
| CN | 205379168 U | | 7/2016 | |
| EP | 2042291 A1 | * | 4/2009 | ........... B29C 45/372 |
| WO | WO-0238352 A2 | * | 5/2002 | ........... B29C 43/184 |

\* cited by examiner

ANTI-FATIGUE MATS AND METHODS FOR MAKING THE SAME

CROSS-REFERENCE TO RELATED APPLICATIONS

This application claims all benefits accruing under 35 U.S.C. § 119 from China Patent Applications Application No. 201710600520.X, filed on Jul. 21, 2017, in the State Intellectual Property Office of China, the disclosure of which is incorporated herein by reference.

FIELD

The present disclosure generally relates to a mat and a method for making the same, and more particularly to an anti-fatigue mat and a method for making the same.

BACKGROUND

Using a mat as intended would eventually result in surface abrasion and other irreversible damage to printed graphics on the mat. Therefore, a traditional dip-dyeing process, such as printing and dyeing, is rarely applied in rendering the surface of the mat products.

SUMMARY

A method for making an anti-fatigue mat includes providing leather comprising a first surface and a second surface opposite to the first surface, and forming a color layer on the first surface. The color of the color layer is different from a color of the leather.

The method also includes cutting the leather, putting the cut leather into a mold having a plurality of protruding structures, which contacts the color layer, injecting an elastomeric ingredient made by a foaming process into the mold, and curing the elastomeric material to form an elastic layer on the second surface and a plurality of concave structures corresponding to the plurality of protruding structures on the first surface. The cut leather and color layer caves towards the second surface to form the plurality of concave structures.

The method also includes polishing the first surface to remove the color layer without caving towards the second surface.

A variety of colors can be uniformly and firmly formed on the surface of the anti-fatigue mat by the above process.

The color layer without caving towards the second surface is removed after the curing process, while the color layer with caving towards the second surface is retained.

A plurality of colors and texture structures having advantages of high abrasion, fastness and long life can be formed on the first surface of the anti-fatigue mat with anti-fatigue performance and vivid stereoscopic impression, while being simple to fabricate with low costs, and can be industrialized.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE DISCLOSURE

The disclosure is illustrated by way of example and not by way of limitation in the figures of the accompanying drawings in which like references indicate similar elements. It should be noted that references to "an" or "a" embodiment in this disclosure are not necessarily to the same embodiment, and such references mean "at least one."

Figure 1:
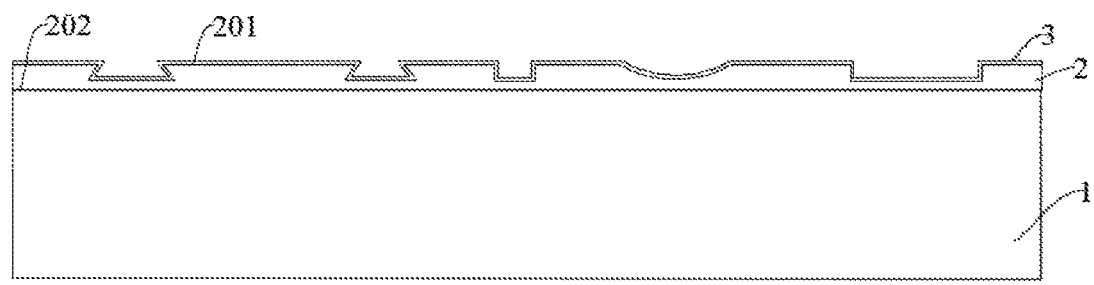
FIG. 1 is a schematic view of a semi-finished product according to an embodiment of the present disclosure.
Figure 2:
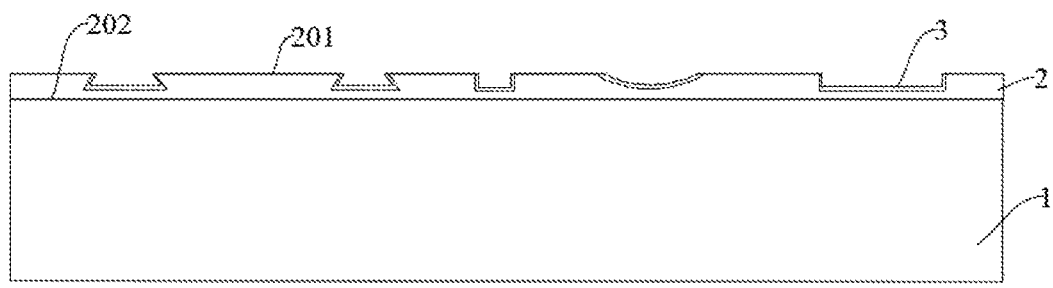
FIG. 2 is a schematic view of an anti-fatigue mat according to an embodiment of the present disclosure.

Referring to FIGS. 1 and 2, the present disclosure provides a method for making an anti-fatigue mat, which comprises the following steps:

S1, providing leather comprising a first surface and a second surface opposite to the first surface, and forming a color layer on the first surface, wherein a color of the color layer is different from a color of the leather;

S2, cutting the leather;

S3, putting the cut leather into a mold having a plurality of protruding structures, wherein the plurality of protruding structures contacts with the color layer, and injecting an elastomeric material made by a foaming process into the mold and curing the elastomeric material to form an elastic layer on the second surface and a plurality of concave structures corresponding to the plurality of protruding structures on the first surface, in which the cut leather and color layer cave towards the second surface to form the plurality of concave structures; and S4, polishing the first surface to remove the color layer without caving towards the second surface.

In step S1, a type of the leather can be polyvinyl chloride (PVC), polyurethane (PU), pigskin, sheepskin, or cowhide. In one embodiment, the type of the leather is PVC leather. The color layer and the plurality of concave structures can be easily formed on the PVC leather.

The step of forming the color layer on the first surface can comprise sub-steps of:

S11, drawing the color layer on the first surface; and

S12, baking the leather with the color layer thereon under a first temperature within a first period, wherein the first temperature ranges from about 45° C. to about 55° C., and the first period ranges from about 25 seconds to about 40 seconds.

In step S11, at least two layers of dyes can be rolled on the first surface of the leather to form the color layer on the first surface. Thereby, the color layer can be uniformly and firmly attached on the first surface of the leather.

In step S12, after baking, the color layer can be more firmly attached to the leather, and a wear-resisting performance of the color layer can be improved. The color layer can be a single color layer or a multi-color layer.

A thickness of the color layer can affect its wear-resistance and material removal. Thus, the thickness of the color layer preferably ranges from about 4 micrometers to about 20 micrometers. In one embodiment, the thickness of the color layer is about 5 micrometers.

In step S2, an edge of the cut leather can be about 3 centimeters to about 5 centimeters greater than an edge of the mold. So that the elastomeric material cannot be leaked from the leather during the injecting process.

Step S2 can further comprise a sub-step of:

S21: baking the cut leather under a second temperature within a second period, wherein the second temperature ranges from about 110° C. to about 150° C., and the second period ranges from about 45 seconds to about 60 seconds. In one embodiment, the second temperature is about 120° C. and the second period is about 60 seconds.

After step S21, the internal stress of the leather can be released to avoid curling and trembling of the leather. If the second temperature is lower than about 110° C., the internal stress of the leather cannot be completely released. If the second temperature is greater than about 150° C., the leather can be easily scorched.

Step S21 can further comprise sub-steps of:

S211, heating the cut leather from room temperature to a third temperature under a first heating rate, wherein the first heating rate ranges from about 2° C./minutes to about 4° C./minutes, and the third temperature ranges from about 80° C. to about 90° C.;

S212, drying the cut leather under the third temperature within a third period, wherein the third period ranges from about 2 minutes to about 3 minutes;

S213, heating the cut leather to the second temperature under a second heating rate, wherein the second heating rate ranges from about 1° C./minutes to about 3° C./minutes; and S214, baking the cut leather under the second temperature within the second period.

The color layer can be adhered to the leather more tightly and the internal stress of the leather can be completely released after heat treatment.

In Step S3, the mold comprises an upper mold and a lower mold. The plurality of protruding structures is located on the lower mold. A shape of the plurality of protruding structures can be different in order to form different shapes of the plurality of concave structures.

A temperature of the mold can range from about 30° C. to about 50° C. In one embodiment, the temperature of the mold is about 38° C. Because the mold is kept in a certain temperature, the final obtained anti-fatigue mat can become more stable and a life of the anti-fatigue mat can increase by about 5 years to about 6 years without damaging the color layer.

An injecting period of the elastomeric material should be within 12 seconds. When the injecting period is longer than about 12 seconds, the elastomeric material cannot react completely or the curing process can happen in advance. Thus, the elastic properties and the anti-fatigue properties of the mat would be reduced. Therefore, the quality and the appearance of the anti-fatigue mat will be impaired.

A curing period of the elastomeric material can range from about 3 minutes to about 6 minutes. In one embodiment, the curing period is about 4.5 minutes.

A material of the elastomeric material can be polyurethane foam mixing material, nitrile rubber foam mixing material, polyurethane foam mixing material, or a combination thereof. In one embodiment, the material of the elastomeric material is the polyurethane foam mixing material which can engage with the leather strongly.

In step S4, the step of polishing the first surface to remove the color layer without caving towards the second surface comprises sub-steps of:

S41, providing a polished head coated with a dilute solution;

S42, applying the polished head on the first surface to remove the color layer without caving towards the second surface.

A material of the dilute solution can be paint thinners, alcohol, alcoholic solution, acetone, petroleum, or a combination thereof. In one embodiment, the material of the dilute solution is paint thinner, so that the color layer can be removed clearly.

An intensity of pressure of the polished head applied on the first surface can range from about 1.9 newtons per cubic centimeter to about 2.80 newtons per cubic centimeter. If the intensity of pressure is lower than about 1.9 newtons per cubic centimeter, the color layer cannot be removed completely. If the intensity of pressure is greater than about 2.80 newtons per cubic centimeter, a plurality of particles and a plurality of black rings would form on the first surface to cause a surface wear of the anti-fatigue mat.

In step S42, the step of applying the polished head on the first surface to remove the color layer without caving towards the second surface comprises sub-steps of:

S421, applying a first intensity of pressure on the first surface by the polished head in a first speed within a first polishing period, wherein the first intensity of pressure ranges from about 1.9 newtons per cubic centimeter to about 2.0 newtons per cubic centimeter, the first speed of the polished head ranges from about 1,000 revolutions per minute (rpm) to about 1,200 rpm, and the first polishing period ranges from about 20 seconds to about 30 seconds.

S422, applying a second intensity of pressure on the first surface by the polished head in a second speed until the color layer is removed, wherein the second intensity of pressure ranges from about 2.3 newtons per cubic centimeter to about 2.5 newtons per cubic centimeter, and the second speed of the polished head ranges from about 700 rpm to about 900 rpm.

In step S421, the color layer without caving towards the second surface would become molten and be diluted, thus, the molten and diluted color layer can be removed easily in step S422.

Furthermore, in some embodiments, the method for making an anti-fatigue mat can further comprise a step of:

S5, dye-fixing treating the color layer caves towards the second surface.

In step S5, the step of dye-fixing treating the color layer caves towards the second surface can comprise sub-steps of:

S51, spraying a dye-fixing agent on the color layer caving towards the second surface; and S52, baking the color layer with the dye-fixing agent thereon under a fourth temperature with a fourth period after the dye-fixing agent is dried, wherein the fourth temperature ranges from about 70° C. to about 80° C., and the fourth period ranges from about 30 seconds to about 40 seconds.

In step S51, the dye-fixing agent can be a UV paint.

Furthermore, in some embodiments, after step S5, the method for making the anti-fatigue mat can further comprise a step of:

S6, putting the baked mat into a ventilator for deodorizing treating, wherein a period of the deodorizing treating ranges from about 48 hours to about 72 hours, and a displacement of the ventilator ranges from about 30 liters per minute to about 50 liters per minute.

After step S6, an odor of the anti-fatigue mat can be removed completely.

A semi-finished product can be polished to obtain the anti-fatigue mat. The semi-finished product comprises an elastic layer 1, a leather 2 and a color layer 3. The leather 2 comprises a first surface 201 and a second surface 202. The color layer 3 is located on the first surface 201. The elastic layer 1 is located on the second surface 202. The color layer 3 and the first surface 201 of the leather 2 both comprises a plurality of concave structures. The color layer 3 without caving towards the second surface 202 is removed to obtain the anti-fatigue mat. The color layer 3 of the anti-fatigue mat is located on the plurality of concave structures.

Furthermore, in some embodiments, the thickness of the leather 2 ranges from about 1 millimeter to about 3 millimeters, and the thickness of the anti-fatigue mat ranges from about 16 millimeters to about 48 millimeters.

EXAMPLE 1

A PVC leather comprising a first surface and a second surface is provided, and a color layer is formed on the first surface of the PVC leather. The leather with the color layer thereon is placed into an oven under a temperature of about 45° C. for about 40 seconds and then cut into small pieces. The cut leather with the color layer thereon is placed into the oven again under a temperature of about 125° C. for about 60 seconds. After cooling, the cut leather with the color layer thereon is placed into a mold with a plurality of protruding structures at about 38° C. After that, a polyurethane foam mixing ingredient is injected into the mold within 10 seconds and the polyurethane foam mixing material is cured for about 4.4 minutes to form an elastic layer on the second surface. During the curing process, a plurality of concave structures corresponding to the plurality of protruding structures are formed on the first surface. Furthermore, a polished head coated with an alcoholic solution is applied on the first surface under an intensity of pressure of about 2.5 newtons per cubic centimeter. Then, a UV paint is sprayed on the color layer caves towards the second surface and dried. Finally, a sample A is obtained by immersing the leather into a ventilator for about 72 hours.

EXAMPLE 2

The method for making an anti-fatigue mat of this embodiment is substantially the same as the method of Example 1, except that when the cut leather is placed into the oven, the cut leather is heat from room temperature to about 90° C. under a heating rate of about 4° C./minutes and then baked under a temperature of about 90° C. for about 120 seconds. Then the cut leather is heated to about 120° C. under a heating rate of about 2° C./minutes and then baked under a temperature of about 120° C. for about 60 seconds. Finally, a sample B is obtained.

EXAMPLE 3

The method for making an anti-fatigue mat of this embodiment is substantially the same as the method of Example 1, except the steps as follows.

After the curing process, a polished head coated with an alcoholic solution is applied on the first surface under a first intensity of pressure of about 2.0 newtons per cubic centimeter for about 25 seconds and a speed of the polished head is about 1,100 rpm. Then the polished head is applied on the first surface under a second intensity of pressure of about 2.4 newtons per cubic centimeter until the color layer removed and a speed of the polished head is about 750 rpm. Finally, a sample C is obtained.

EXAMPLE 4

The method for making an anti-fatigue mat of this embodiment is substantially the same as the method of Example 1, except that when the cut leather is placed into the oven, the cut leather is heat from room temperature to about 90° C. under a heating rate of about 4° C./minutes and then baked under a temperature of about 90° C. for about 120 seconds. Then the cut leather is heat to about 120° C. under a heating rate of about 2° C./minutes and then baked under a temperature of about 120° C. for about 60 seconds.

After the curing process, a polished head coated with an alcoholic solution is applied on the first surface under a first intensity of pressure of about 2.0 newtons per cubic centimeter for about 25 seconds and a speed of the polished head is about 1,100 rpm. Then the polished head is applied on the first surface under a second intensity of pressure of about 2.4 newtons per cubic centimeter until the color layer removed and a speed of the polished head is about 750 rpm. Finally, a sample D is obtained.

TEST EXAMPLE

Test 1: The Sample A, Sample B, Sample C, and Sample D are placed into an oven under a temperature of about 40° C. for about 72 hours. A slight curling phenomena of the leather is discovered in Sample A and Sample C while the slightly curling phenomena is not discovered in Sample B and Sample D. A result of Text 1 shows that the internal stress of the leather in Sample B and Sample D is completely released.

Test 2: The Sample A, Sample B, Sample C, and Sample D are soaked in water for about 36 hours. Then, the Sample A, Sample B, Sample C, and Sample D is placed into a friction device having an applied weight of about 500 grams, respectively. The first surface of the Sample A, Sample B, Sample C, and Sample D are scrubbed by the friction device about 2500 times, respectively.

Varying degrees of wear phenomenon are formed in Sample A, Sample B, Sample C. The most serious wear phenomenon occurs in Sample A. The lightest wear phenomenon occurs in Sample C. The wear phenomenon is not presented in Sample D.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A method for making an anti-fatigue mat, the method comprising steps of:
   S1 of providing leather comprising a first surface and a second surface opposite to the first surface, and forming a color layer on the first surface, wherein a color of the color layer is different from a color of the leather;
   S2 of cutting the leather;
   S3 of putting the cut leather into a mold having a plurality of protruding structures, wherein the plurality of protruding structures contact the color layer, and injecting an elastomeric material into the mold and curing the elastomeric material to form an elastic layer on the second surface and a plurality of concave structures corresponding to the plurality of protruding structures on the first surface, wherein the cut leather and color layer cave toward the second surface to form the plurality of concave structures; and
   S4 of polishing the first surface to remove portions of the color layer outside of the concave structures thereby obtaining the anti-fatigue mat.

2. The method as claimed in claim 1, wherein in step S1, the step of forming the color layer on the first surface comprises sub-steps of:
   S11 of drawing the color layer on the first surface; and S12 of baking the leather with the color layer drawn thereon at a baking temperature ranging from about 45° C. to about 55° C., and for a baking period ranging from about 25 seconds to about 40 seconds.

3. The method as claimed in claim 1, further comprising a step of baking the leather after step S2 at a temperature ranging from about 110° C. to about 150° C., and a baking period ranging from about 45 seconds to about 60 seconds.

4. The method as claimed in claim 1, wherein in step S3, a temperature of the mold ranges from about 30° C. to about 50° C.

5. The method as claimed in claim 1, wherein in step S3, an injecting period of injecting the elastomeric material is less than about 12 seconds.

6. The method as claimed in claim 5, wherein in step S3, a curing period of the elastomeric material ranges from about 3 minutes to about 6 minutes.

7. The method as claimed in claim 1, wherein in step S4, the step of polishing the first surface to remove the portions of the color layer outside of the concave structures comprises sub-steps of:
S41 of providing a polished head coated with a dilute solution; and
S42 of applying the polished head on the first surface to remove the portions of the color layer outside of the concave structures.

8. The method as claimed in claim 7, wherein an intensity of pressure of the polished head applied on the first surface ranges from about 1.9 newtons per cubic centimeter to about 2.80 newtons per cubic centimeter.

9. The method as claimed in claim 1, further comprising dye-fixing treating the color layer after step S4.

* * * * *